US00RE41483E

(19) United States
(12) Reissued Patent
Hsu et al.

(10) Patent Number: US RE41,483 E
(45) Date of Reissued Patent: Aug. 10, 2010

(54) POSITION-RETAINING METHOD AND SYSTEM FOR A SCANNING SYSTEM CAPABLE OF COPY AND FACSIMILE

(76) Inventors: Wei-Shu Hsu, 7F, No. 12, Alley 3, Lane 225, Min Tsu W. Road, Ta T'ung Area, Taipei (TW); Hsiu-Hong Chen, 10F-1, No. 459, Chung Cheng R., Hsin Chu 300 (TW)

(21) Appl. No.: 11/894,058

(22) Filed: Aug. 16, 2007

Related U.S. Patent Documents

Reissue of:
(64) Patent No.: 6,930,799
Issued: Aug. 16, 2005
Appl. No.: 09/725,244
Filed: Nov. 29, 2000

(51) Int. Cl.
*H04N 1/40* (2006.01)

(52) U.S. Cl. ..... 358/1.9; 358/406

(58) Field of Classification Search ..... 358/1.2, 358/1.9, 1.12, 1.18, 406, 453, 449–451
See application file for complete search history.

(56) References Cited

U.S. PATENT DOCUMENTS 6,453,080 B1 * 9/2002 Kao ..... 382/312
6,643,416 B1 * 11/2003 Daniels et al. ..... 382/299
6,930,799 B2 8/2005 Hsu et al.

* cited by examiner

*Primary Examiner*—Thomas D Lee
*Assistant Examiner*—Stephen M Brinich
(74) *Attorney, Agent, or Firm*—Perkins Coie LLP

(57) ABSTRACT

In a computer network consisting of at least one host computer and computer peripheral devices, such as scanners, fax machines, and printers, a user may use a hot key on the scanner to copy, scan, e-mail, and faxing etc. via the control of an application program. An auto-crop module implemented in the host computer can automatically crop the image of a scanned sheet. The cropped image is saved in the memory device. Before sending the cropped image to the computer peripheral devices, the computing module will compute the output format of the cropped image according to the resolution requirement and scaling factor of the associated computer peripheral device. The retained position will be also saved in the memory. In response to the user operation, the image of the scanned sheet with its retained position will be transmitted to the printer or facsimile machine via the control of the application program.

29 Claims, 6 Drawing Sheets

POSITION-RETAINING METHOD AND SYSTEM FOR A SCANNING SYSTEM CAPABLE OF COPY AND FACSIMILE

Matter enclosed in heavy brackets [ ] appears in the original patent but forms no part of this reissue specification; matter printed in italics indicates the additions made by reissue.

BACKGROUND OF THE INVENTION

A. Field of the Invention

The present invention relates to a method and system for a scanning system capable of copy and facsimile, especially to a position-relating method and system for a scanning system in a computer network, thereby to scan multiple sheets at one time.

B. Description of the Related Art

For the concern of convenience, the flatbed scanners currently on the market are provided with hot keys for scan, print, copy and e-mail. The hot keys are implemented on the housing of the flatbed scanners. They can also be implemented as a floating menu to be displayed on the screen of a controlling host computer. The operations of the hot keys are controlled by the application program 11 of a host computer 10. The user only needs to press a hot key to perform an associated function of scan, copy, e-mail, copy, or facsimile. Based on the control of the application program 11, the image of the scanned sheet is processed by the host computer 10 and then sent to an associated computer peripheral device, such as the printer 13, or the facsimile machine 14 in response to the request of the user.

However, the output formats of a scanned sheet provided by the conventional hot keys for copy and facsimile are based on a fixed orientation (0,0). Take copy for an example. The user only needs to place a scanned sheet on a sheet table of the flatbed scanner and then press the hot key to perform the copy procedure. The hot key enables the copy routine of the host computer to directly copy the image of the scanned sheet without the interactive operations of the user. However, the printout of the scanned sheet always has its top left corner aligned to the position of (0,0) of the output paper. It does not print the scanned sheet according to its original position when placed on the sheet table.

The major problem of this output format is that it cannot scan multiple sheets at one time. To be able to scan multiple sheets, the output format of the scanned image must be able to retain the original relative position of the scanned sheet relative to the sheet table. However, if the user wants to retain the relative position of the scanned sheet relative to the sheet table, he has to pre-scan the sheet together with the entire background image of the sheet table. And then, he must crop the entire scan range of the sheet table to retain the relative position of the scanned sheet relative to the sheet table. This will inevitably increase the time for scanning because it has to process many redundant background image data.

SUMMARY OF THE INVENTION

Accordingly, it is an object of the invention to provide a position-retaining method and system for a scanning system capable of copy and facsimile, thereby to scan multiple sheets at one time.

It is another object of the invention to provide a position-retaining method and system for a scanning system which can print or fax the auto-cropped image without the pre-scan procedure, thereby to improve the scan efficiency.

Accordingly, the method of the invention includes the following steps: first, read the image data of the scanned sheet. Then, perform the auto-crop procedure to automatically crop the image of the scanned sheet in real time to differentiate the foreground image data from the background image data. The cropped image data is saved as a default data format, such as BMP. After that, compute the relative position of the scanned sheet relative to the sheet table. And then, save the relative position of the scanned sheet. Finally, print or fax the image of the scanned sheet according to its relative position and the resolution of the output device.

In a computer network consisting of at least one host computer and several computer peripheral devices, such as scanners, fax machines, and printers, a user can press a hot key for the scanner to copy, scan, fax, and e-mail, etc. via the control of an application program. An auto-crop module implemented in the host computer can automatically crop the image of a scanned sheet. The cropped image is saved in the memory device. The system also includes a memory device for saving the cropped image data. Then, the application program will initiate an associated printer or facsimile machine interface for configuring a printer or a facsimile machine according to a user's request. The computing module computes the relative positions of the scanned sheet according to the resolution of the output device and a scaling factor as requested by the user. And then, the application program sends the image data of the scanned sheet, its retained position, and resolution to the printer or facsimile machine via the control of the application program.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and advantages of the present invention will become apparent when considered in view of the following description and accompanying drawings which are given by way of illustration only, and thus are not limitative of the present invention, and wherein.

DETAILED DESCRIPTION OF THE INVENTION

The present invention integrates the auto-crop technology with the one-touch operation for scan, facsimile, and print.

Figure 1:
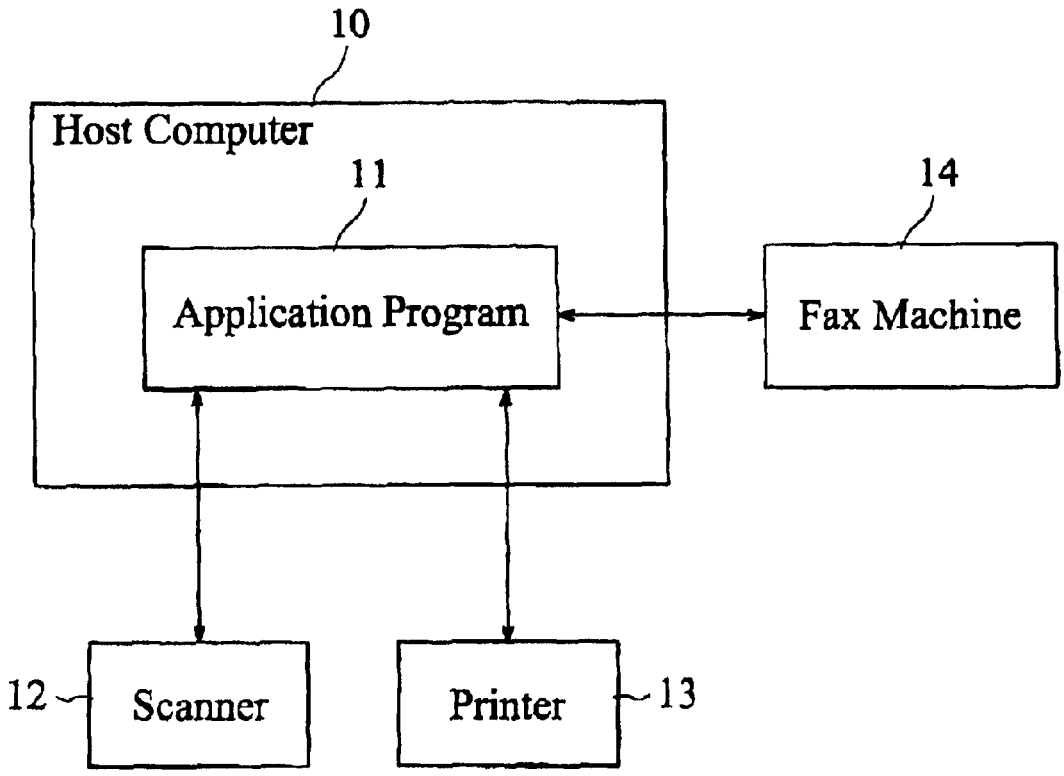
FIG. 1 is a system diagram showing the communication of the host computer and computer peripheral devices via the control of the application program.
Figure 2:
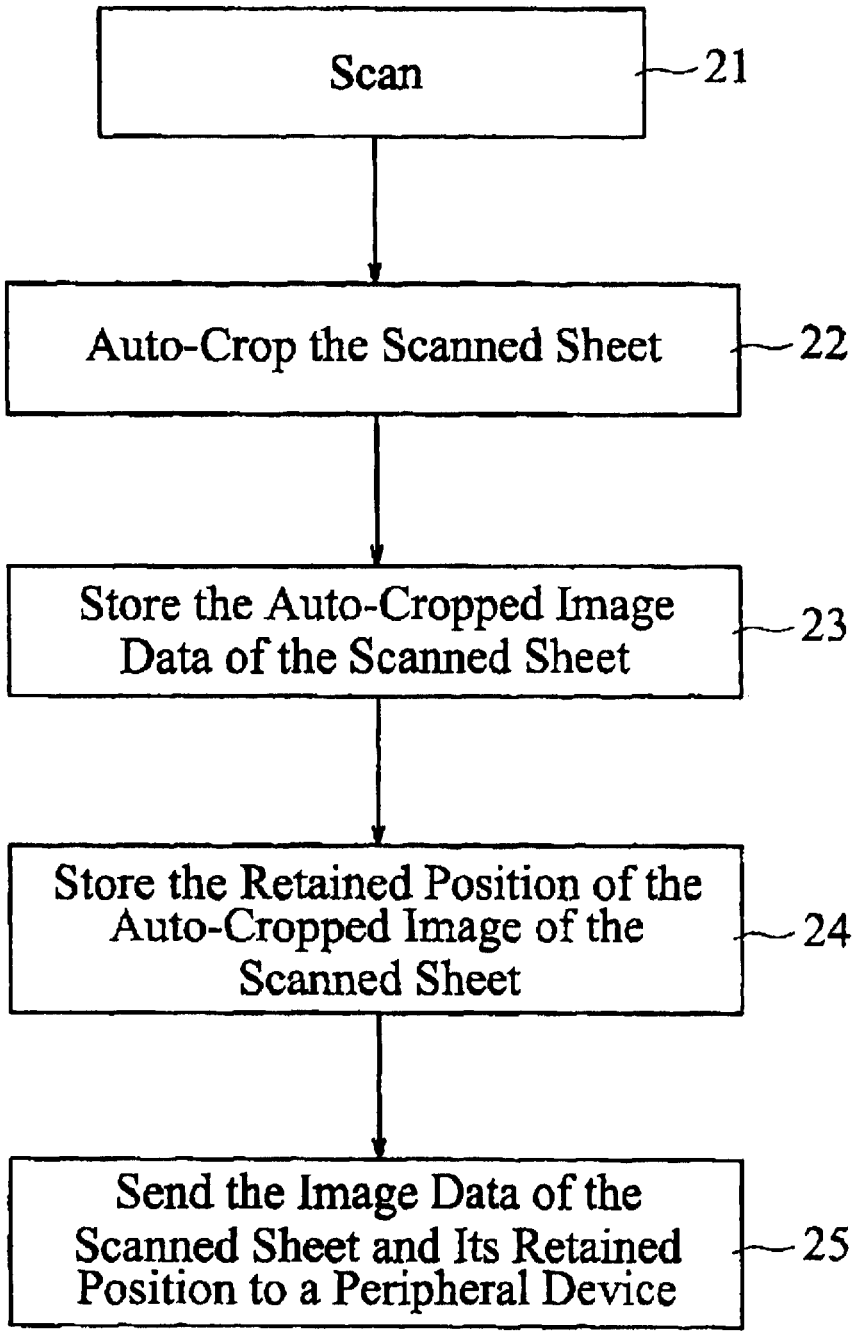
FIG. 2 is a flow diagram showing the method of retaining relative position of a scanned sheet relative to a frame position of the sheet table according to the preferred embodiment of the invention.

To be able to scan multiple sheets at one time, the relative position of the scanned sheet relative to the sheet table must be retained. The method of the invention is shown in FIG. 2.

When the user places a sheet on the sheet table and presses the hot key for copy or facsimile, the application program of the host computer will control the scanner to perform image scanning, step 21. The length and width of the scanned image can be determined at the time of scanning using the auto-crop technology, step 22. Since the position of the scanned sheet is determined with reference to the sheet table, so the position of the scanned sheet is computed relative to the sheet table. Then, the application program stores the auto-cropped image of the scanned sheet, step 23. And then, the application program stores the width and length information of the scanned sheet, and its retained position, step 24. Finally, the application program sends the auto-cropped image of the scanned sheet and its retained position and size to a peripheral device, such as a printer, or a fax machine, step 25. With the retained position, the peripheral device will be able to print or fax the scanned image with its retained position relative to the sheet table. Accordingly, the invention can print or fax the scanned sheet with its retained position without having to perform the pre-scan procedure.

Figure 3:
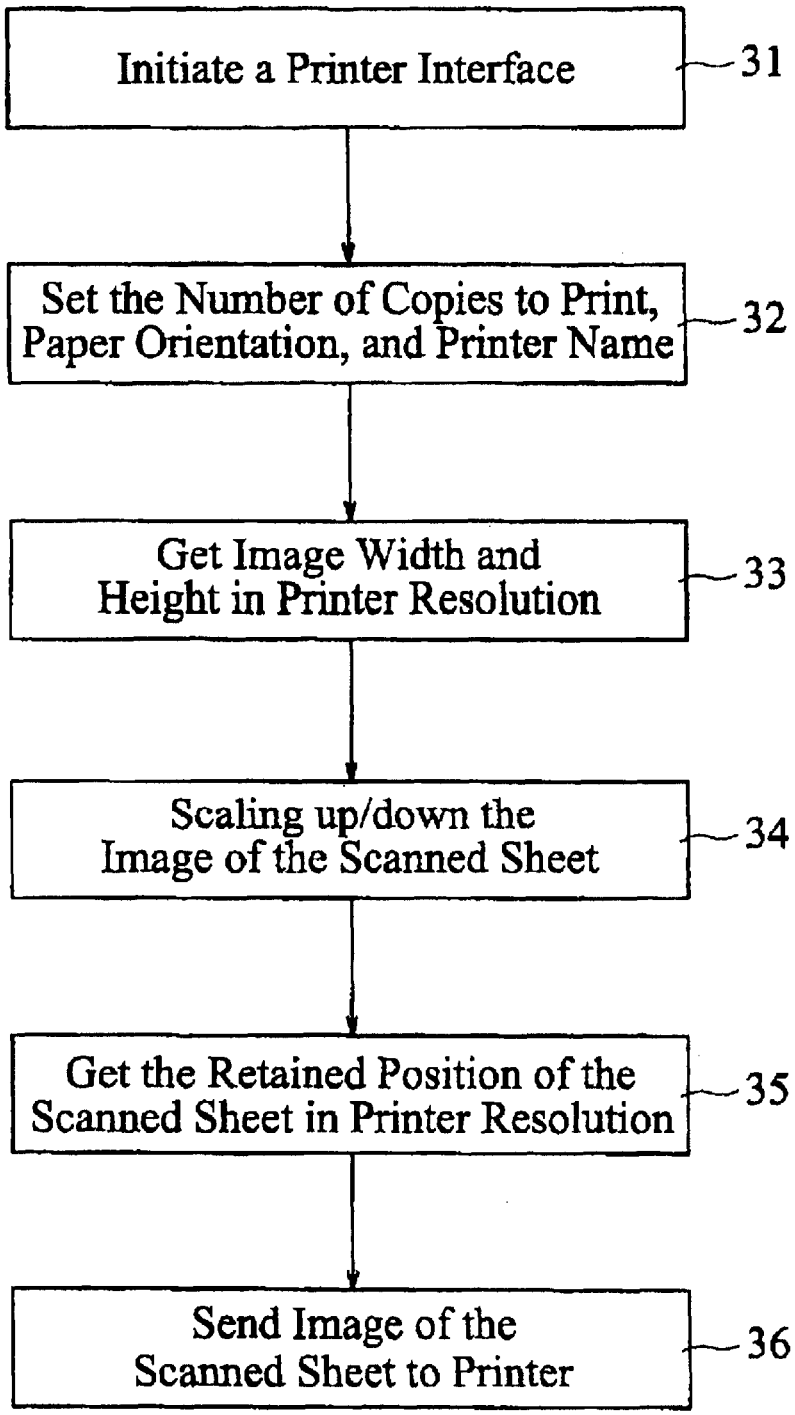
FIG. 3 is a flow diagram showing the method of copying the image of a scanned sheet while retaining its position relative to a frame position of the sheet table according to the preferred embodiment of the invention.

According to the spirit of the invention, the detailed steps of the printing procedure are illustrated in FIG. 3. After finishing the step of auto-cropping, the application program initiates a printer interface step 31. The printer interface shows interactive configuration dialogs for acquiring printing information, such as, the number of copies to print, paper orientation, printer name, and scaling factor, etc. After obtaining the information, the application program configures the default printer according to user request, step 32.

Then, compute the new size of the scanned image according to the resolution of the printer, step 33. After that, the auto-cropped image of the scanned sheet is scaled up/down according to its retained position, the requested scaling factor, and the printer resolution, step 34.

And then, compute the retained position of the scanned sheet in printer resolution, step 35. Finally, the printer can print the scanned sheet with the retained position by receiving parameters of retained position, new image width and height, original image width and height and the image of the scanned sheet, step 36.

Figure 4:
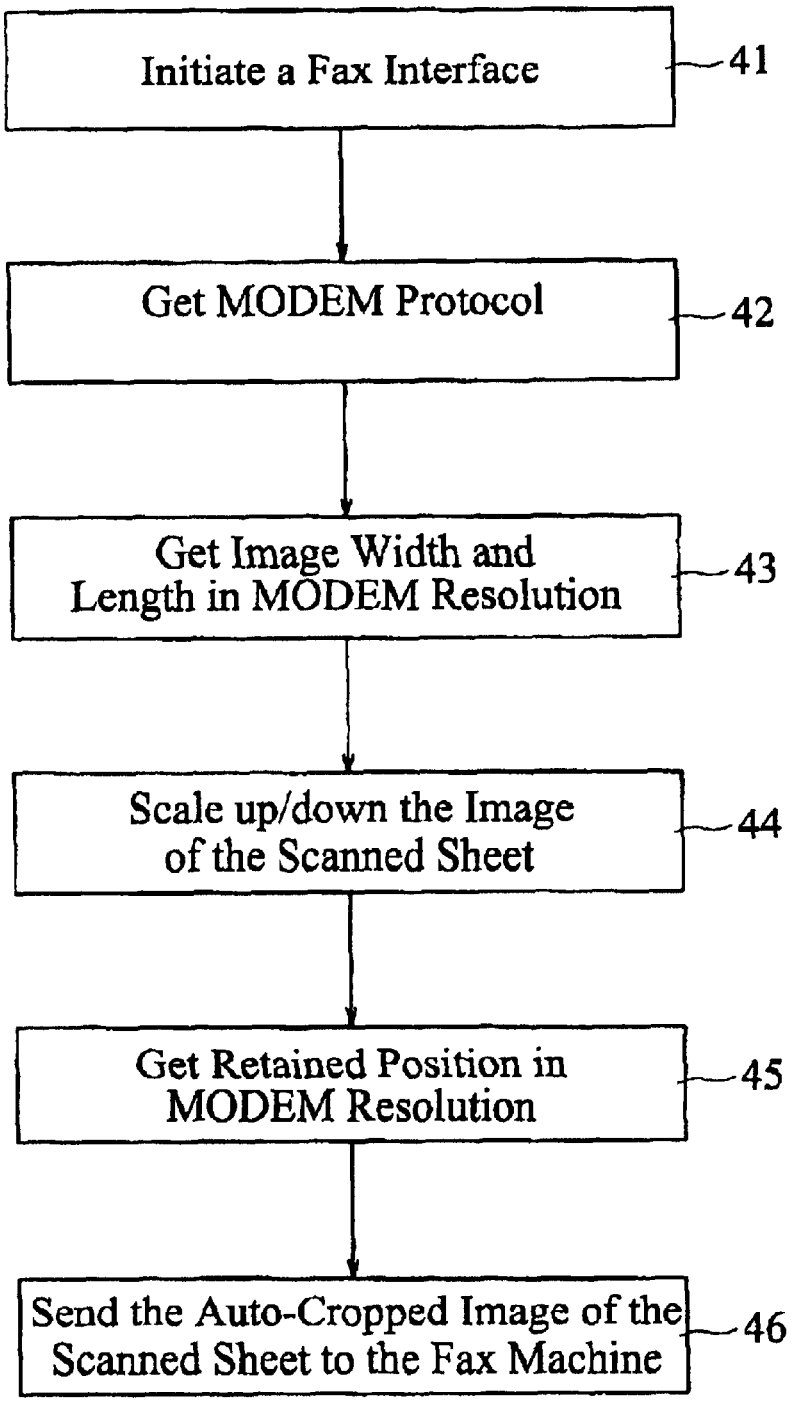
FIG. 4 is a flow diagram showing the method of faxing the image of a scanned sheet while retaining its position relative to a frame position of the sheet table according to the preferred embodiment of the invention.

If the invention is applied to a facsimile machine, the steps for facsimile procedure are illustrated in FIG. 4. After the step of auto-cropping, the application initiates a fax interface for facsimile transmission. The fax interface shows interactive configuration dialogs for acquiring fax information, such as: sender and receiver information, and their facsimile machine numbers etc. The application program obtains the default facsimile machine information, and sets the facsimile number as requested by the user, step 41.

When the fax procedure begins, the application program obtains the communication protocol of the MODEM, such as G3/G4 protocol, step 42. Then, obtain the length and width of the image of the scanned sheet according to the resolution of the MODEM, step 43. Since the MODEM and the scanner have different resolutions, so the image of the scanned sheet has to be further scaled up/down, step 44.

Then, the application program obtains the retained position of the scanned image according to the resolution of the MODEM, step 45. After that, send the auto-cropped image of the scanned sheet to the MODEM, including the parameters of the new image width and height, original image width and height, and the image of the scanned sheet, step 46.

Figure 5:
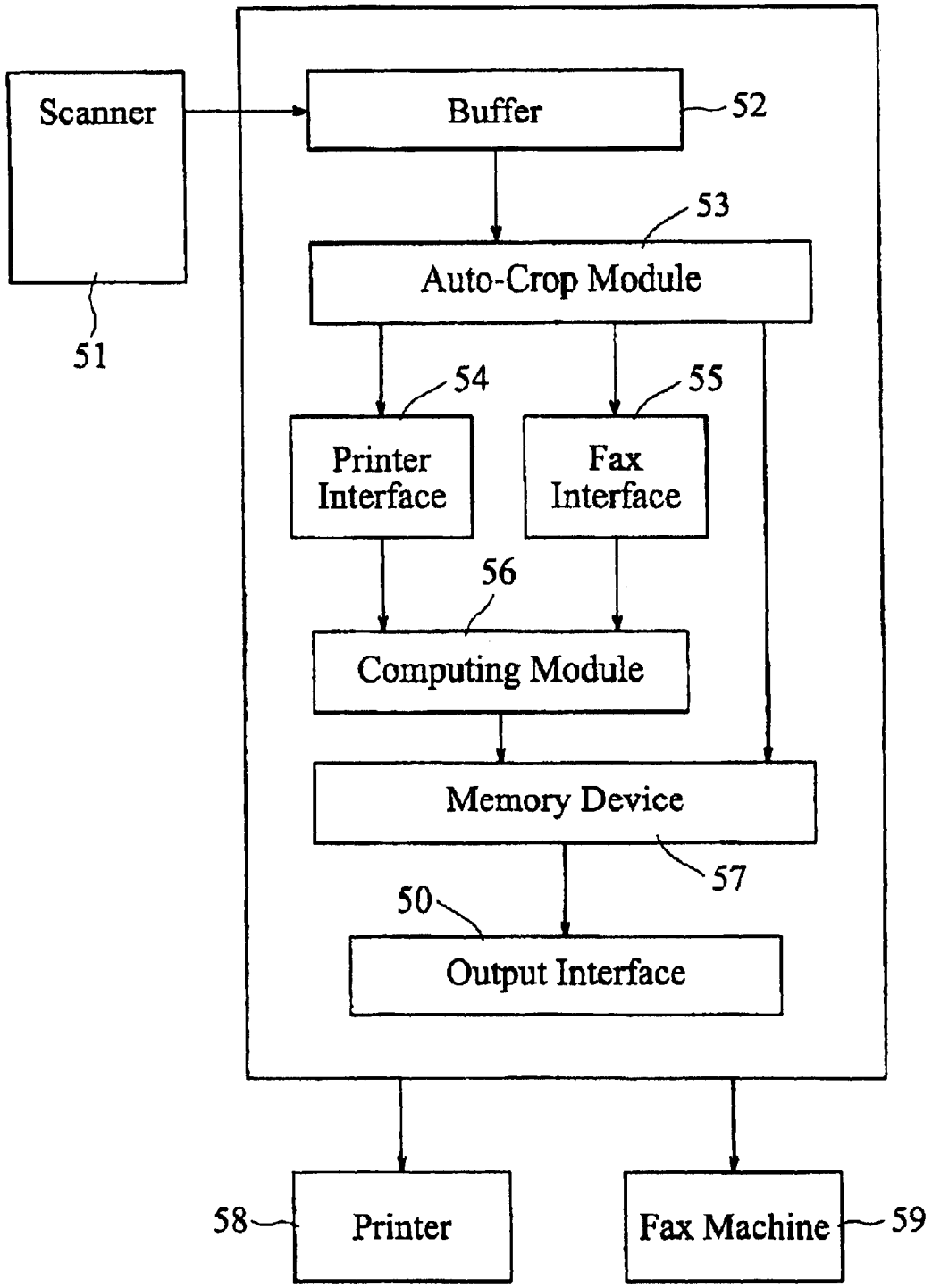
FIG. 5 is a functional block diagram showing the system of the invention.

The system of the invention is illustrated in FIG. 5. In a computer network formed by a host computer 60 and peripheral devices, such as a scanner 51, printer 58, and facsimile machine 59, the host computer 60 has a buffer 52 for temporality storing image data from the scanner 51. The buffer 52 usually saves the scanned image as a default format, such as a BMP. The auto-cropping module 53 reads the image data in the buffer 52 to auto-crop the image of the scanned sheet from the background image and then save the auto-cropped image data in the memory device 57. After that, application program of the host computer 60 initiates a printer Interface 54 or a Fax Interface 55 to obtain the requests of the user, such as scaling factors, resolution, and the fax machine number of the receiver, etc.

The computing module 56 computes the new retained position of the scanned sheet, its resolution after scaling up/down in response to the user request. The computation results will be saved in the memory device 57. Then, the output interface 50 will send the auto-cropped image data and its retained position from the memory device 57 to the printer 58 or fax machine 59.

To improve the efficiency of auto-cropping when determining the scope of the scanned sheet, the present invention applies binary search to quickly determine the position of the scanned sheet with reference to the sheet table. Take scanning a single sheet for an example. The binary search is always starts search from half way of the search region to quickly differentiate the foreground from the background.

Assume the scanned sheet is placed properly on the sheet without skew or oblique so that the print result will be the best. Assume also that the image of the scanned sheet is saved as a Bit Map Pixel (BMP) format. The present invention applies binary search to quickly determine the length and width of the scanned sheet while performing auto-cropping. The binary search starts from setting the length and width of the sheet table as the search range. Then, the search begins from half of the length or half of the width. If the image of the scanned sheet is not found, the search range is minimized to half of the previous search range. Repeat the search procedure until the scanned image is found.

Figure 6:
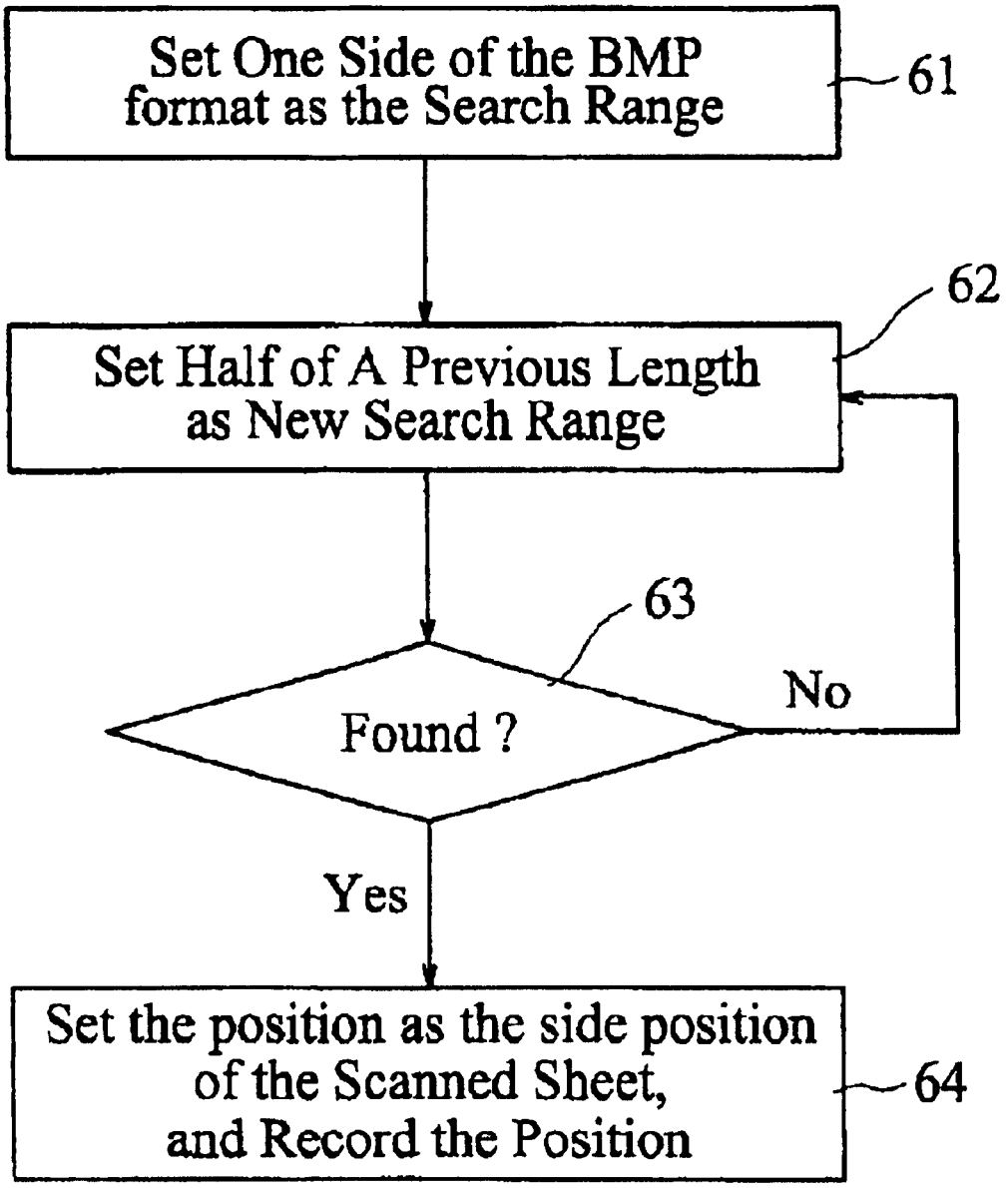
FIG. 6 is a flow diagram showing the binary searching method for finding the position of a scanned sheet.

The application of binary search in the present invention is illustrated in FIG. 6. Since the information of the sheet table has already been saved in the buffer as a BMP format, so read the entire image from the buffer. And then, take the length of the BMP format as the search range, step 61. Find the mid-point of the length of the BMP, step 62. Then, determine if pixel at the mid-point belongs a foreground image by its gray level, step 63. If not, the search range of the length is minimized to half of its previous search range and repeat binary search again. Simultaneously conduct the same search on the other half of the length, step 62. Repeat the same search procedure from top to bottom by performing steps 62 and 63 until a bottom line of the scanned sheet has been found, step 64.

Then, after finding the bottom line, the bottom line of the search range is updated to the newly defined position of the bottom line and then save the position of the bottom line. Then, set the length of the BMP format as the search range again, step 61. Conduct the binary search on the search range again to find the top line of the scanned sheet, step 62. Repeat steps 62 and 63 until the top line of the scanned sheet is found. After the top line is found, save the positions of the top line and the bottom line, step 64.

Then, the search range is set to the BMP width and the length is set to the positions of the bottom line and the top line just found. Conduct the binary search again to find the left side and right side of the scanned sheet. After they are found, record their positions. Thus, the relative position of the four sides of the scanned sheet can be efficiently determined.

To sum up, the present invention can efficiently determine the retained position of the scanned sheet so that the auto-crop technology can be easily integrated with the hot key operation to print/fax a scanned sheet with retained position relative to the sheet table. As a result, the invention allows users to put multiple sheets on the sheet table and scan them at one time.

It should be understood that various alternatives to the structures described herein may be employed in practicing the present invention. It is intended that the following claims define the invention and that the structure within the scope of these claims and their equivalents be covered thereby.

What is claimed is:

1. A position-retaining method for a scanning system capable of copy and facsimile, *the method* comprising [the steps of]:

reading an image of a scanned sheet;

auto-cropping said image of said scanned sheet;

storing said auto-cropped image of said scanned sheet;

saving a retained position of said scanned sheet relative to a sheet table;

transmitting said auto-cropped image of said scanned sheet and said retained position of said scanned sheet to a computer peripheral device, the computer peripheral device comprises at least a printer; and computing a new retained position of said scanned sheet relative to said sheet table according to a resolution and a scaling factor of said printer.

2. The position-retaining method as claimed in claim 1, wherein said computer peripheral device further comprises at least a facsimile machine.

3. The position-retaining method as claimed in claim 2, further comprising the step of setting a fax number of a receiving site.

4. The position-retaining method as claimed in claim 1, wherein said [step of] auto-cropping *further* comprise*s*[ing the steps of]:

conducting a binary search on said image of said scanned sheet; and automatically cropping said scanned sheet by determining said retained position of said scanned sheet.

5. A position-retaining system for a scanning system capable of copy and facsimile, comprising:

a buffer for storing an image of a scanned sheet;

an auto-crop module coupled to said buffer for cropping the image of said scanned sheet and outputting said auto-cropped image;

a printer interface for interactively acquiring printer configurations in response to a user request;

a computing module for computing the retained position of said auto-cropped image relative to a sheet table according to said printer configurations;

memory means for storing said auto-cropped image and said retained position of said scanned sheet relative to a sheet table; and an output interface connected to said memory means for transmitting said auto-cropped image and said retained position of said scanned sheet relative to said sheet table to a computer peripheral device.

6. The position-retaining system as claimed in claim 5, wherein said computer peripheral device comprises at least a printer.

7. The position-retaining system as claimed in claim 5, wherein said computer peripheral device comprises at least a facsimile machine.

8. The position-retaining system as claimed in claim 5, further comprising a fax interface for interactively acquiring settings for a facsimile machine.

9. The position-retaining system as claimed in claim 8, wherein said computing module computes the retained position of said scanned sheet relative to said sheet table according to [aid] *said* facsimile machine configurations.

10. The position-retaining system as claimed in claim 5, wherein said buffer stores said image of said scanned sheet as Bit Map Pixel format.

*11. A method, comprising:*

*scanning an image of a sheet;*

*auto-cropping the image;*

*transmitting the auto-cropped image and a retained position of the sheet relative to a sheet table to a computer peripheral device, the computer peripheral device comprising at least a printer; and*

*computing a new retained position of said scanned sheet relative to said sheet table according to a resolution and a scaling factor of said printer.*

*12. The method of claim 11, further comprising storing the auto-cropped image.*

*13. The method of claim 11, wherein the computer peripheral device further comprises a facsimile machine.*

*14. The method of claim 11, further comprising determining the retained position of the sheet.*

*15. A system, comprising:*

*an auto-crop module configured to crop an image of a scanned sheet;*

*a printer interface configured to interactively acquire printer configurations in response to a request; and*

*a computing module configured to compute a retained position of the auto-cropped image relative to a sheet table according to a resolution and a scaling factor of said printer.*

*16. The system of claim 15, further comprising:*

*a buffer configured to store the image of the scanned sheet.*

*17. The system of claim 16, wherein the buffer stores the image of the scanned sheet in a bit map pixel format.*

*18. The system of claim 15, further comprising:*

*an output interface configured to transmit the auto-cropped image and the retained position of the scanned sheet relative to the sheet table to a computer peripheral device.*

*19. The system of claim 17, wherein the computer peripheral device comprises a printer.*

*20. The system of claim 17, wherein the computer peripheral device comprises a facsimile machine.*

*21. The system of claim 15, further comprising:*

*memory means configured to store the auto-cropped image and the retained position of the scanned sheet relative to the sheet table.*

*22. The system of claim 15, further comprising:*

*a fax interface configured to interactively acquire configuration settings for a facsimile machine.*

*23. The system of claim 22, wherein the computing module is configured to compute a retained position of the auto-cropped image relative to the sheet table according to the acquired facsimile machine configurations.*

*24. An apparatus, comprising:*

*means for scanning an image of a sheet;*

*means for auto-cropping the image;*

*means for transmitting the auto-cropped image and a retained position of the sheet relative to a sheet table to a computer peripheral device, the computer peripheral device comprising at least a printer; and*

*means for computing a new retained position of said scanned sheet relative to said sheet table according to a resolution and a scaling factor of said printer.*

*25. The apparatus of claim 24, further comprising means for storing the auto-cropped image.*

*26. The apparatus of claim 25, wherein the means for storing the auto-cropped image comprises a buffer.*

*27. The apparatus of claim 26, wherein the means for auto-cropping the image comprises an auto-crop module coupled to the buffer.*

*28. The apparatus of claim 24, wherein the computer peripheral device further comprises a facsimile machine.*

*29. The apparatus of claim 24, further comprising means for determining the retained position of the sheet.*

* * * * *